(12) United States Patent
Wiles et al.

(10) Patent No.: US 12,344,155 B2
(45) Date of Patent: Jul. 1, 2025

(54) QUICK-RELEASE TRACK FITTINGS

(71) Applicant: Valeda Company, LLC, Oakland Park, FL (US)

(72) Inventors: James Douglas Wiles, Whitstable (GB); Bryan David Platt, Whitstable (GB)

(73) Assignee: Valeda Company, LLC, Oakland Park, FL (US)

( * ) Notice: Subject to any disclaimer, the term of this patent is extended or adjusted under 35 U.S.C. 154(b) by 485 days.

(21) Appl. No.: 17/857,613

(22) Filed: Jul. 5, 2022

(65) Prior Publication Data

US 2023/0010694 A1 Jan. 12, 2023

Related U.S. Application Data

(60) Provisional application No. 63/219,872, filed on Jul. 9, 2021.

(51) Int. Cl.
*B60P 7/08* (2006.01)
*A61G 3/08* (2006.01)
(Continued)

(52) U.S. Cl.
CPC .......... *B60P 7/0815* (2013.01); *A61G 3/0808* (2013.01); *B60N 2/01525* (2013.01); *B64D 11/0696* (2013.01)

(58) Field of Classification Search
CPC .......... B60N 2/012525; B60N 2/01541; B60N 2/015252; B60N 2/01575; B60P 7/0815; B64D 11/0696
See application file for complete search history.

(56) References Cited

U.S. PATENT DOCUMENTS

| | | | |
|---|---|---|---|
| 6,357,715 B1 * | 3/2002 | Sawdy | B60N 2/01525 296/65.13 |
| 2021/0237619 A1 * | 8/2021 | Sawdy | B60N 2/085 |

FOREIGN PATENT DOCUMENTS

| | | |
|---|---|---|
| DE | 29808871 U1 | 9/1999 |
| EP | 1034969 B1 | 6/2005 |

(Continued)

OTHER PUBLICATIONS

International Search Report and Written Opinion date Oct. 18, 2022 for PCT/US2022/036099.

*Primary Examiner* — Daniel J Colilla
(74) *Attorney, Agent, or Firm* — Daniel Tallitsch; Tyler Schultz

(57) ABSTRACT

A quick-release fitting for lockingly engaging between two inwardly-directed lips of a track may comprise two resilient plates that are spreadable via a blade moved between raised/disengaged and lowered/engaged positions via a four-bar linkage mechanism. The lower edges of the plates may comprise flanges that extend at angles corresponding to the angles of the undersides of the inwardly-directed lips. To concentrate contact forces between the fitting and the track, and reduce a spreading force on the track, the plates may include a neck region immediately above the flanges. The quick-release fitting may also include a roller assembly allowing the structure being supported by the fitting to be tilted rearward and moved. The roller assembly may include features to keep the quick-release fitting aligned with the track when moved.

23 Claims, 9 Drawing Sheets

(51) Int. Cl.
*B60N 2/015* (2006.01)
*B64D 11/06* (2006.01)

(56) References Cited

FOREIGN PATENT DOCUMENTS

| | | | |
|---|---|---|---|
| FR | 2762813 | B1 | 6/1999 |
| GB | 2459660 | B | 7/2012 |
| WO | 2003004304 | A1 | 1/2003 |

* cited by examiner

QUICK-RELEASE TRACK FITTINGS

CROSS-REFERENCE TO OTHER APPLICATIONS

This application claims priority to U.S. Provisional Patent Application No. 63/219,872, entitled "QUICK-RELEASE TRACK FITTINGS," filed on Jul. 9, 2021, the contents of which are incorporated by reference. This application is filed concurrently with PCT Patent Application No. PCT/US22/36099, entitled "QUICK-RELEASE TRACK FITTINGS," filed on Jul. 5, 2022, the contents of which are incorporated by reference.

BACKGROUND

Technical Field

The embodiments described and claimed herein relate generally to mechanisms and fittings adapted for removably engaging various structures, including but not limited to seat supports for supporting a seat in a vehicle, with a track in the vehicle.

Background Art

Commercial and other special-use vehicles, including but not limited to buses, vans and aircraft, are often outfitted with longitudinally-extending tracks in or on the floor that are configured to receive, engage with, and support various structures, such as seats and wheelchair securement systems. The tracks permit flexible arrangement and easy installation and removal of such structures anywhere along the length of the tracks. One of the most widely used track is referred to in the industry as L-track and is shown in FIG. 1. The track 1 is generally formed from extruded aluminum in a generally C-shape. An open channel 2 extends lengthwise along the top surface of the track 1 with undercuts 11, 13 extending under the top surface of the track to either side of the open channel 2. A series of equally-spaced holes 3 may be drilled or formed along the length of the open channel 2 to define two opposing, scalloped, inwardly directed lips 4, 5. Each of the lips 4,5 may be described as having opposing faces 6,7 that may be generally vertical and undersides 8, 9, that may be as sloped relative to horizontal. Notably, the opposing faces 6, 7 and undersides 8, 9 may be oriented at other angles. The undersides 8, 9 may be described as having a root portion 15, defined from the continuous longitudinal surface of the undersides 8, 9 that is uninterrupted by the holes 3 (a longitudinal strip deep in the undercuts 11, 13).

Various fittings configured for engagement with the track 1 are commercially available. See, for example, U.S. Pat. No. 7,637,705 (the '705 patent), incorporated herein by reference, which discloses a track fitting with visual indicia of engagement. The device disclosed in the '705 patent is commercially available from Q'Straint, and is typically used to secure wheelchair tie-downs to the floor.

Another prior art fitting configured to secure structures, in this instance a seat, to a floor track is disclosed in EP1034969B1 (the '969 patent), incorporated herein by reference, and shown herein in FIGS. 2-4. As described in more detail in the '969 patent:

[the fitting takes the form of a clamping mechanism 17 comprising] two spaced apart, parallel substantially, vertical, substantially identical plates 20,21 (see FIG. 4) . . . . [T]he lower edge of the plate 20 carr[ies] an outwardly directed and integrally formed flange 26 and the lower edge of the plate 21 carr[ies] an outwardly directed integrally formed flange 27. The flanges are directed outwardly away from each other . . . . The flanges [26,27] are then positioned so that the flanges may be inserted between the lips [4 and 5] of the [track] 1 . . . . The seat support 10 may thus be brought into a sliding engagement with the track 1. Pivotally mounted between the plates 20,21 is a knife element 40. The knife element is formed, as can be seen most clearly from FIG. 4, from three adjacent sheets of metal such as steel 41,42,43, the outer-most sheets of which are so configured that the central portions of the sheets are biased resiliently outwardly. The knife element 40 is pivotally mounted, by means of a pivot shaft 44 to the arms 24 of the two plates. The other end of the knife element has a slot 45. A pivot 46, at one end of a lever 47 passes through the slot 45. The lever 47 has a central portion pivotally connected by means of a pivot 48 to part of the plates 20,21 opposed to the arms 24. The lever 47 has an extending operating handle 49 which extends beyond the plates 20,21. When the clamping mechanism 17 is in the initial condition, as shown in Figure [2], the knife 40 is an elevated position and is thus not located between the inwardly inclined regions 33,35 of the plates 20,21, but is spaced above the inwardly inclined regions of the plates 20,21. The lower edges of the plate 20,21 carrying the flanges 26,27 are thus resiliently biased inwardly enabling the flanges to be inserted through the slot 5 of the track 1. If the handle 49 of the lever 47 is now moved in an anti-clockwise direction as shown in the accompanying drawings, the knife 40 will pivot in a generally clockwise sense about the pivot axis 44. The knife will thus be moved, between the plates 20,21 with the knife engaging the inwardly inclined lower portions 33,35 of the plates. As the knife continues to move downwardly, the outwardly bowed sheets 41,43 will tend to be moved inwardly, due to the force applied to the knife by the inwardly inclined regions 33,35 of the plates 20,21, but equally the inwardly inclined regions 33,35 will be moved outwardly against their own resilient bias, thus moving the flanges 26,27 to a position in which they engage the under-surfaces of the lips [4 and 5] of the track 1 . . . . It is to be appreciated that in the described embodiment, when the seat support 10 is mounted on a track 1, and when the clamping mechanism 17 is in the clamping position as shown in FIG. 3, the flanges 26,27 which have a substantial axial extent, firmly engage the lips 7 and 8 provided on the channel over a substantial extent, and consequently the flanges are able to withstand a substantial force, as may be applied to the flanges, should an accident arise.

While the commercial embodiment of the '969 patent, manufactured by NMI Safety Systems, Ltd. has been accepted as a floor securement solution, there are several shortcomings that prevent universal usage of the NMI fitting, for example in combination with the varying grades and quality of track being used by the industry. Notably, not only is the knife 40 of NMI's patented fitting substantially narrower than the full width of the plates 20, 21 as shown in FIG. 3, but also the fitting utilizes a linkage configuration that prevents widening the knife 40 while keeping the width of the plates 20, 21 constant (i.e., to make the knife 40 equally wide as the plates 20, 21). As can be appreciated in FIG. 2, extending the width of the knife 40 to the right would cause interference between the knife 40 and the pivot 48, while extending the width of the knife 40 to the left would most likely prevent full disengagement of the knife from the plates 20, 21, wherein the plates 20, 21 cannot return fully inward to a state where the flanges 26, 27 may be inserted through the channel 2 of the track 1 (i.e., the far left lower edge of the knife 40 will still remain engaged with the inwardly inclined regions 33,35, and push them outward). Due to the resiliency of the plates 20, 21, less than optimal engagement will be obtained between NMI's plates 20, 21, and the track 1, especially in the regions of the plates 20, 21 rightward and leftward of the knife 40. Moreover, the use of a narrower knife 40 requires the force between the plates 20, 21 and the track 1 to be concentrated in the region of the knife 40 (rather than being distributed across the entire width of the plates 20, 21), which could cause the channel 2 of a weak track to open.

In addition to preventing the knife 40 from having a width equal to the plates 20, 21, the configuration of NMI's patented fitting also limits the extent to which the width of the knife 40 and plates 20, 21 can collectively be extended. More particularly, it has been found that the knife 40 must be rotated to roughly 30° as shown in FIG. 2 to fully disengage the knife 40 from between the plates 20, 21. This means that the widths of the knife 40 and plates 20, 21 cannot be extended without also substantially increasing the height of the fitting. Noting that increasing the widths of the knife 40 and plates 20, 21 would increase the strength of the engagement with the track 1, NMI's design can be difficult or impractical to use where high strength engagement is required and space is limited.

Other shortcomings in NMI's design relate to: (a) the linear (straight) shape of the cross sections of the inwardly inclined lower regions 33,35 as they extend from the vertical upper regions 32, 34 to the flanges 26, 27; and (b) the angle of the flanges 26, 27 located at the bottom of the inwardly inclined lower regions 33, 35, which as shown in FIG. 10 has been measured as approximately 53° (in an unsecured position) to 50° (in a secured position). These features collectively have been shown to result in unnecessary contact between, on the one hand, the flanges 26, 27 and the lower regions 33, 35, and on the other hand the opposing faces 6, 7 of the lips 4, 5—this unnecessary contact exerts an undesirable spreading force on the track that tends to open the channel 2. Also, these features collectively have been shown to result in insufficient contact between the flanges 26, 27 and the undersides 8, 9 of the lips 4, 5, and also the absence of contact between the flanges 26, 27 and the root 15 of the undersides 8, 9. The resulting spreading force and insufficient contact has been found to reduce the strength of the connection, especially with lower quality (e.g., thinner) construction channels.

SUMMARY OF THE PRESENT EMBODIMENTS

Clearly, the prior art devices have limitations which the present embodiments overcome. Various new embodiments of a quick-release track fitting are contemplated that solve those limitations, which embodiments comprise combinations of any one or more of the following features or other features described elsewhere in this disclosure:

A first plate positioned adjacent a second plate, the first plate having a first lower region and the second plate having a second lower region.

A blade being moveable between a first position in which the blade is substantially disengaged from at least one of the first lower region and the second lower region and a second position in which the blade engages with at least one of the first lower region and the second lower region to move at least one of the first lower region and the second lower region away from the other of the first lower region and the second lower region.

At least one link having a first pivot point connecting a first end of the at least one link to at least one of the first plate and the second plate and a second pivot point connecting a second end of the at least one link to the blade, the at least one link being operable to control the movement the blade between the first position and the second position, wherein substantially the entire blade is disposed below the first pivot point of the at least one link in both the first position and the second position.

At least two links as described above.

The blade, at least one of the first plate and the second plate, and the two links define a four-bar linkage.

The blade has a blade longitudinal axis and at least one link has a link longitudinal axis, whereby the link longitudinal axis is approximately normal to the blade longitudinal axis when the blade is in the second position.

A lever is rigidly connected to and extends from at least one link, the lever allowing for manipulating the blade between the first position and the second position by a hand.

A four-bar linkage is configured such that one side of a lower edge of the blade is lower than an opposite of the lower edge when the blade is disposed between the first position and the second position.

A four-bar linkage is configured such that the one side is at approximately the same elevation as the opposite side when the blade is disposed in the second position.

The first position of the blade is an unlocked position and the second position is a locked position.

A first flange depends from the first lower region and a second flange depends from the second lower region, both at a flange angle that generally corresponds to a lip angle of an underside of the inwardly directed lips of the track.

The flange angle is approximately equal to the lip angle.

The flange angle is within 5° of the lip angle.

The flange angle is within 10° of the lip angle.

The flange angle is within 15° of the lip angle.

A first flange depends from the first lower region and a second flange depends from the second lower region, both at a flange angle of approximately 15° relative to horizontal.

A first flange depends from the first lower region and a second flange depends from the second lower region, both at a flange angle of approximately 10-20° relative to horizontal.

A first flange depends from the first lower region and a second flange depends from the second lower region, both at a flange angle of approximately 5-25° relative to horizontal.

A first flange depends from the first lower region and a second flange depends from the second lower region, both at a flange angle of approximately 0-30° relative to horizontal.

At least a portion of at least one flange is positioned for engagement with a root of the underside of the track lip.

At least a portion of each flange is positioned for engagement with a root of the underside of the track lip.

A spring-loaded locking pin is provided for holding the blade in the second position, the spring-loaded locking pin being fixed to one of either the first plate or the second plate and being aligned for engagement with a detent when the blade is in the second position, the detent being fixed to one of the blade or the at least one link.

The detent extends from at least one link.

The first lower region and the second lower region each include a flange depending from a neck region, wherein each flange is configured to engage with an underside of the two inwardly directed lips when the quick-release track fitting is secured in the track, and each neck region includes a neck height that is greater than a face height of an opposing face of the two inwardly directed lips.

Each neck region is configured for substantial non-contact with the opposing face of the two inwardly directed lips.

Each neck region is substantially vertical.

Each neck region is configured to substantially eliminate a spreading force from being exerted on the opposing face of the two inwardly directed lips.

Further forms, objects, features, aspects, benefits, advantages, and embodiments will become apparent from the detailed description and drawings provided herewith.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

Figure 1:
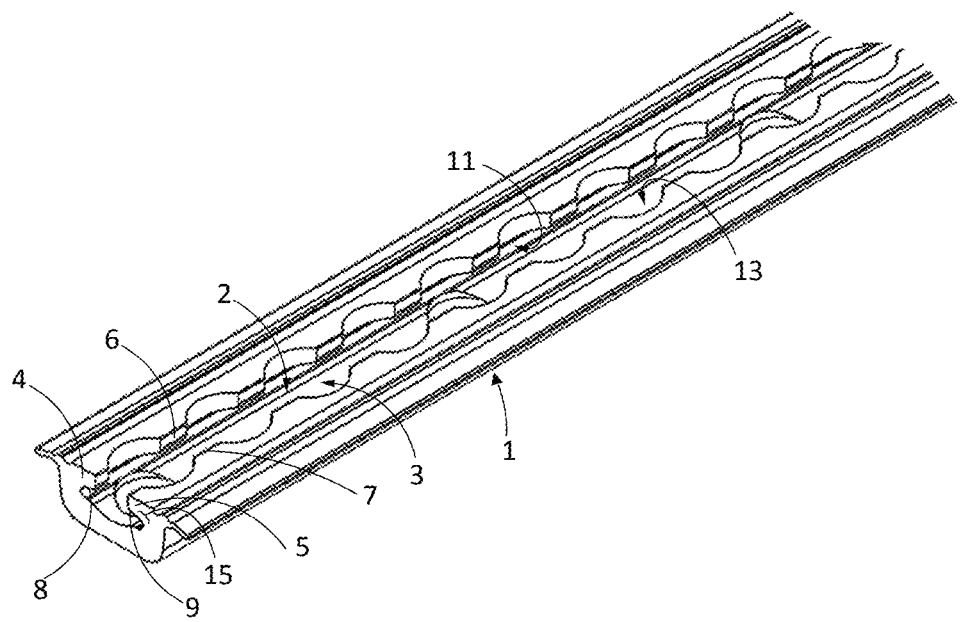
FIG. 1 is a perspective view of a prior art L-track.
Figure 2:
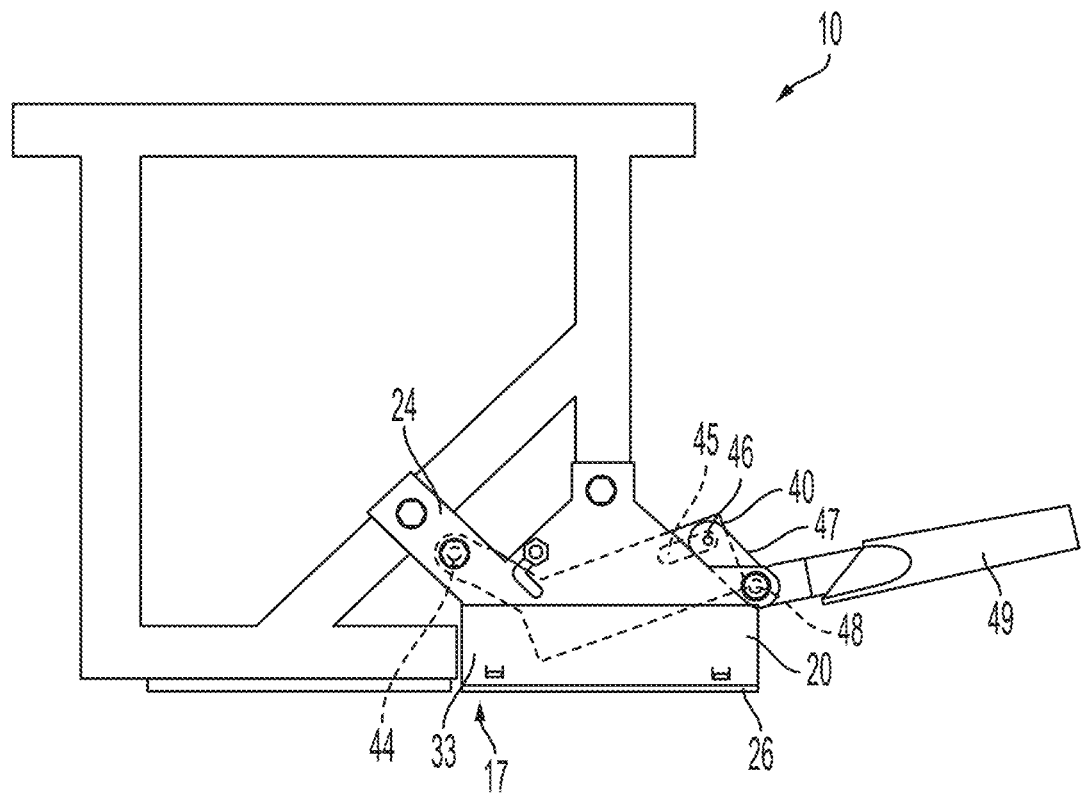
FIG. 2 is first front view of a prior art seat support and clamping mechanism for securing the seat support in the floor track.
Figure 3:
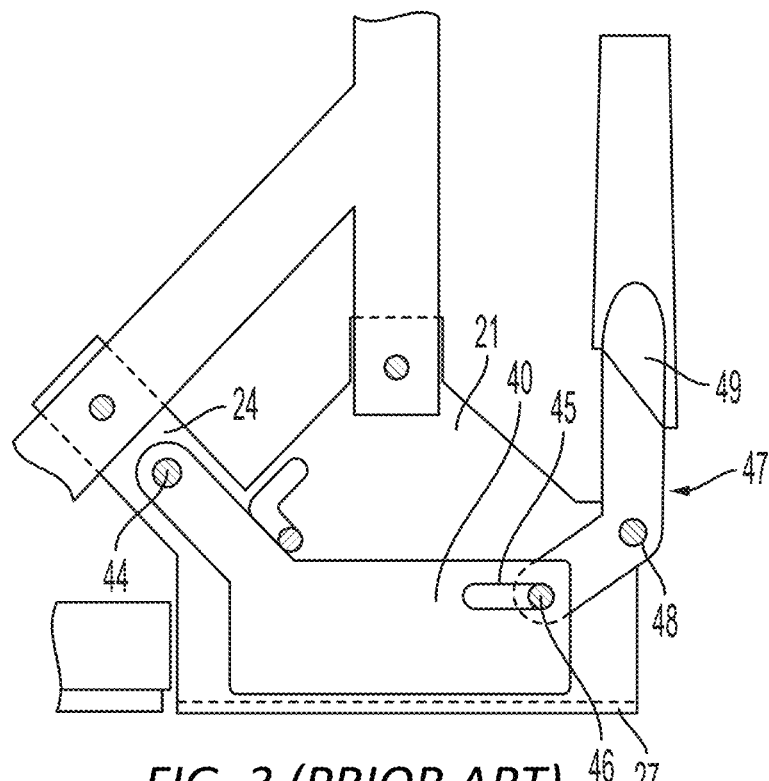
FIG. 3 is second front view of the prior art seat support and clamping mechanism of FIG. 2.
Figure 4:
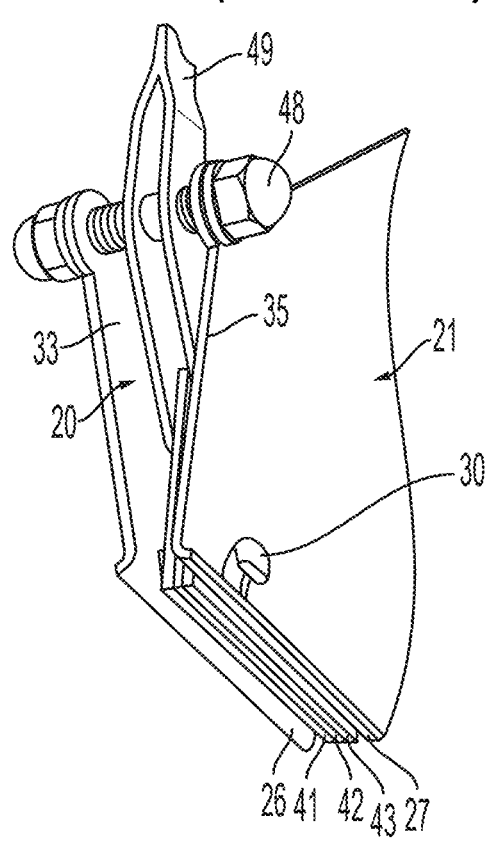
FIG. 4 is a perspective view of the prior art seat support and clamping mechanism of FIG. 2.
Figure 5:
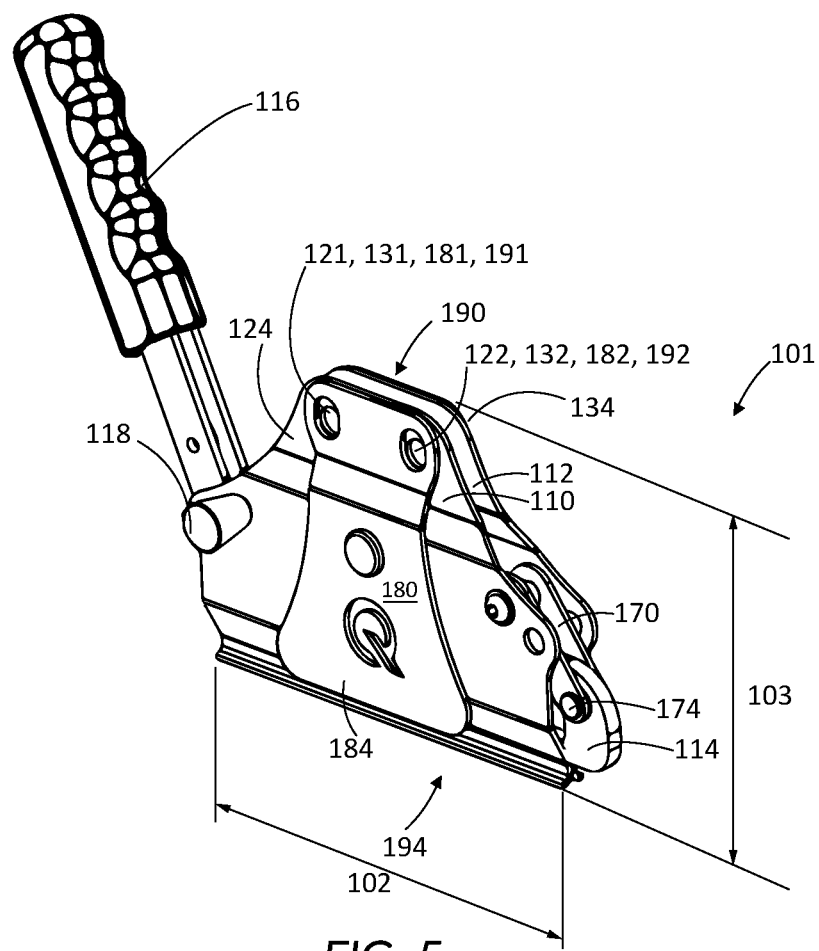
FIG. 5 is a first perspective view of an improved quick-release track fitting.
Figure 6:
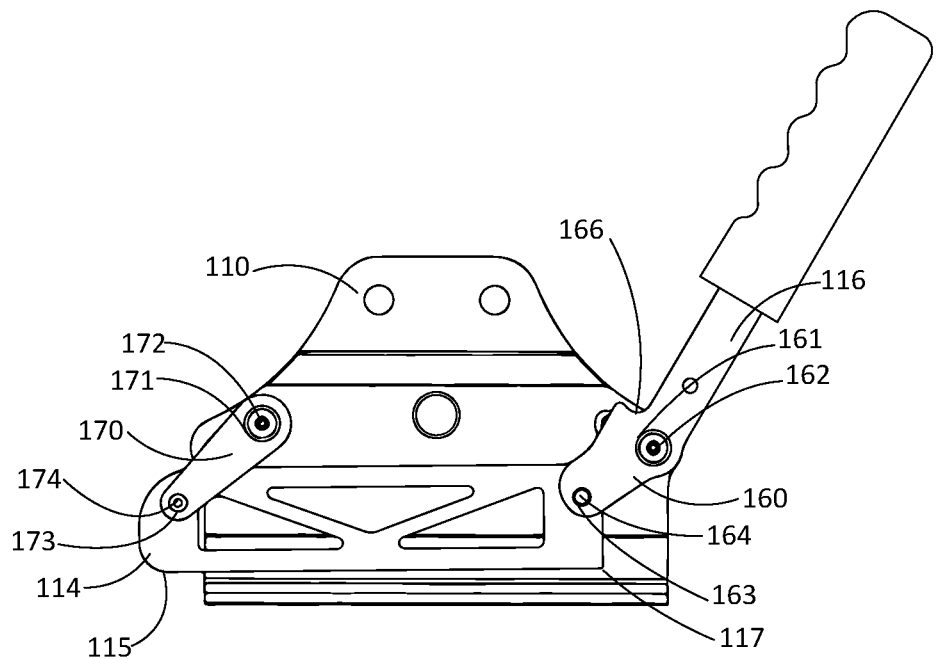
FIG. 6 is a first front view of the improved quick-release track fitting of FIG. 5, which shows the fitting in an unlocked configuration.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

For the purpose of promoting an understanding of the principles of the inventions, reference will now be made to the embodiments illustrated in the drawings and specific language will be used to describe the same. It will nevertheless be understood that no limitation of the scopes of the inventions is thereby intended. Any alterations and further modifications in the described embodiments and any further applications of the principles of the inventions as described herein are contemplated as would normally occur to one skilled in the art. Although a limited number of embodiments are shown and described, it will be apparent to those skilled in the art that some features that are not relevant to the claimed inventions may not be shown for the sake of clarity.

With reference to FIGS. 5-9 and 12-14, a quick-release track fitting 101 is shown in typical configurations, with a longitudinal axis 102 that may be aligned along a length of a track 1 for locking engagement. The track 1 may be of several different types, including but not limited to an L-track type, which includes a series of equally spaced holes 3, or may be of a Unistrut type, which is the same or similar to L-track but does not include holes 3. Typically, the track 1 is installed in a floor of a vehicle with the length of the track 1 aligned from front to rear of the vehicle. In that respect, the longitudinal axis 102 (or width) of the fitting 101 may be generally horizontal and generally parallel to the floor, while the height 103 of the fitting 101 may be generally vertical. However, the track 1 may be installed on other surfaces, including those oriented vertically, upside down, or at any other angle. For purposes of this description, it is assumed that the fitting 101 is installed in a floor-mounted track 1 where the height 103 of the fitting 101 is aligned vertically.

The quick-release track fitting 101 may include two adjacent plates, a first plate 110 and a second plate 112, which may generally surround or sandwich a blade 114 and a linkage mechanism, which may comprise at least a first link 160 and perhaps a second link 170 or additional links. In this case, the first link 160 and the second link 170 each comprise two links 160a, 160b, 170a, 170b that are both positioned between the first plate 110 and second plate 112 and sandwich the blade 114. The linkage mechanism interconnects at least one of the first plate 110 and the second plate 112 with the blade 114, whereby the blade 114 is able to move relative to the plates 110, 112 by operation of the linkage mechanism. In this case, the linkage mechanism interconnects both plates 110 and 112 with the blade 114.

In one embodiment, a lever 116 is rigidly connected to (e.g., integral with or mechanically fixed to) and extends from the first link 160 away from the plates 110, 112, whereby the lever 116 can be accessed and hand-operated to effect movement of the blade 114 relative to the plates 110, 112. As with the first link 160, the lever can comprise two separate levers 116a, 116b that extend from first links 160a, 160b.

The first link 160 may be pivotally connected at a first (e.g., upper) end to at least one of the first plate 110 and the second plate 112, via a pin assembly 161 defining pivot point 162, and may be pivotally connected at a second (e.g., lower) end to the blade 114, via a pin assembly 163 defining pivot point 164. In a similar manner, the second link 170 may be pivotally connected at a first (e.g., upper) end to at least one of the first plate 110 and the second plate 112, via a pin assembly 171 defining pivot point 172, and may be pivotally connected at a second (e.g., lower) end to the blade 114, via a pin assembly 173 defining pivot point 174. In that respect, one or both of the plates 110, 112, the link 160, the link 170, and the blade 114 may define a four-bar linkage, for example with one or both of the plates 110, 112 serving as a ground link, the link 160 serving as an input rocker link or crank, the link 170 serving as an output rocker link, and the blade 114 serving as a floating link. With specific reference to FIG. 14, pin assemblies 161, 171 may each comprise a pin 161a, 171a (which extend through apertures in links 160, 170), spring washers or spacers 161b, 161c, 171b, 171c and washers 161d, 161e, 171d, 171d (which permit rotation of levers 160, 170 relative to plates 110, 112), and fasteners 161f, 161g, 171f, 171g (which hold the fitting 101 together). Similarly, pin assemblies 163, 173 may each comprise a pin or rivet 163a, 173a and one or more washers or spacers 173b, 173c, which may be located between links 170a, 170b, and blade 114.

The locations of the pivot points 162, 164, 172, 174 and the distances between pivot point 162 and pivot point 164 and between pivot point 172 and pivot point 174 may be configured to move the blade 114 between a first (or raised) position and a second (or lowered) position. As will be hereafter described, in the raised position, the blade 114 is disengaged from the plates 110, 112 whereby the quick-release fitting 101 is in an unlocked condition and may be inserted or removed from between the lips 4, 5 of the track 1. In the lowered position, the blade 114 engages with one or both of the plates 110, 112 to divide the plates 110, 112 whereby the quick-release fitting 101 is in a locked condition and may not be removed from between the lips 4, 5 of the track 1 (or if not already inserted, may not be inserted between the lips 4, 5 of the track 1).

To prevent inadvertent release of the quick-release fitting 101 from the track, a lock mechanism may be provided to lockingly engage with the blade 114 and/or the linkage mechanism (e.g., one or both of the first link 160 and the second link 170) to hold the blade 114 in the lowered position. As one example, the quick-release fitting may include a spring-loaded pin 118 affixed through an aperture in one or the other of the first plate 110 and the second plate 112. The spring-loaded pin 118 is spring biased inwardly toward engagement with a detent 166 formed in the first link 160 (or in an extension thereof, such as the lever 116). The detent 166 is located so that it engages the spring-loaded pin 118 when the blade 114 is in the lowered position to prevent movement of the blade 114 to the raised position. The spring-loaded pin 118 includes a gripping portion whereby the user can first pull the spring-loaded pin 118 outward and out of engagement with the detent 166, and then manipulate the lever 116 to move the blade 114 to the raised position. Notably, the spring biasing nature of the spring-loaded pin 118 enables the pin to automatically engage with the detent 166 when the lever 116 is used to move the blade 114 to the lowered position.

Figure 7:
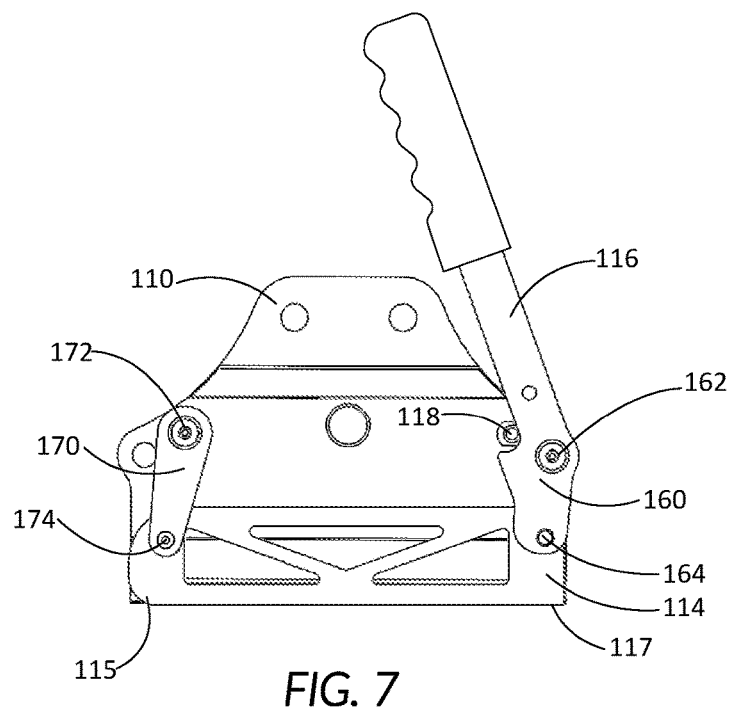
FIG. 7 is a second front view of the improved quick-release track fitting of FIG. 5, which shows the fitting in a locked configuration.
Figure 8:
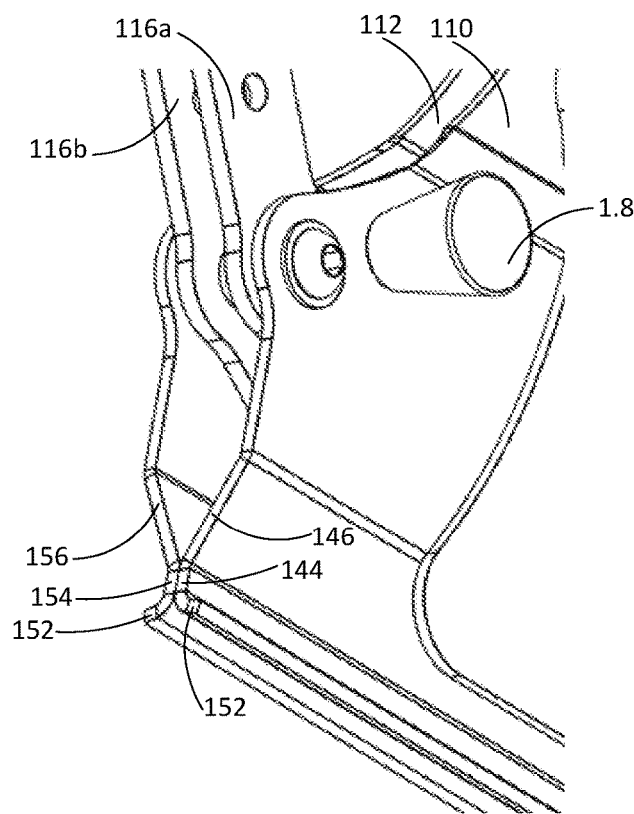
FIG. 8 is a second perspective view of the improved quick-release track fitting of FIG. 5.
Figure 9:
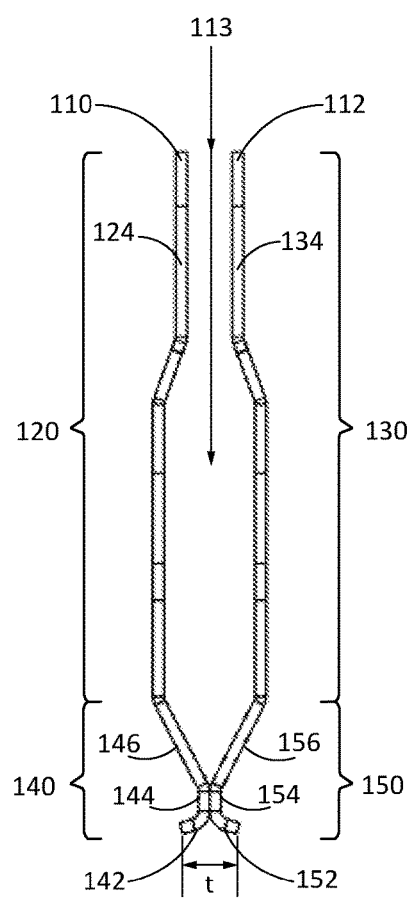
FIG. 9 is a first side view of the improved quick-release track fitting of FIG. 5.
Figure 10:
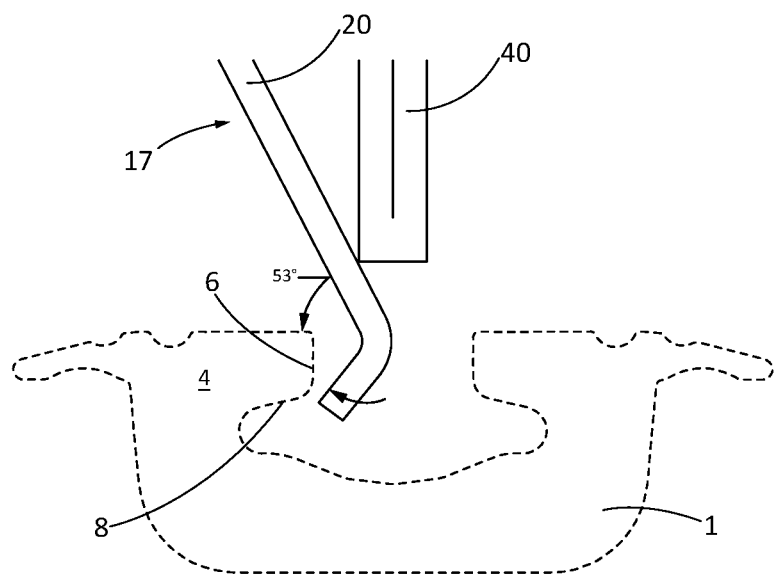
FIG. 10 is a first side view of the prior art clamping mechanism of FIG. 2, which shows the prior art clamping mechanism unlocked and inserted in a track.
Figure 11:
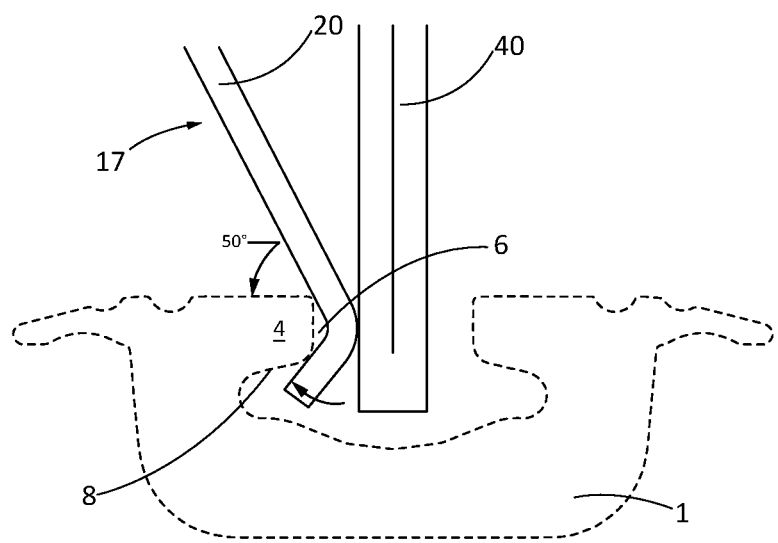
FIG. 11 is a second side view of the prior art clamping mechanism of FIG. 2, which shows the prior art clamping mechanism locked and inserted in a track.
Figure 12:
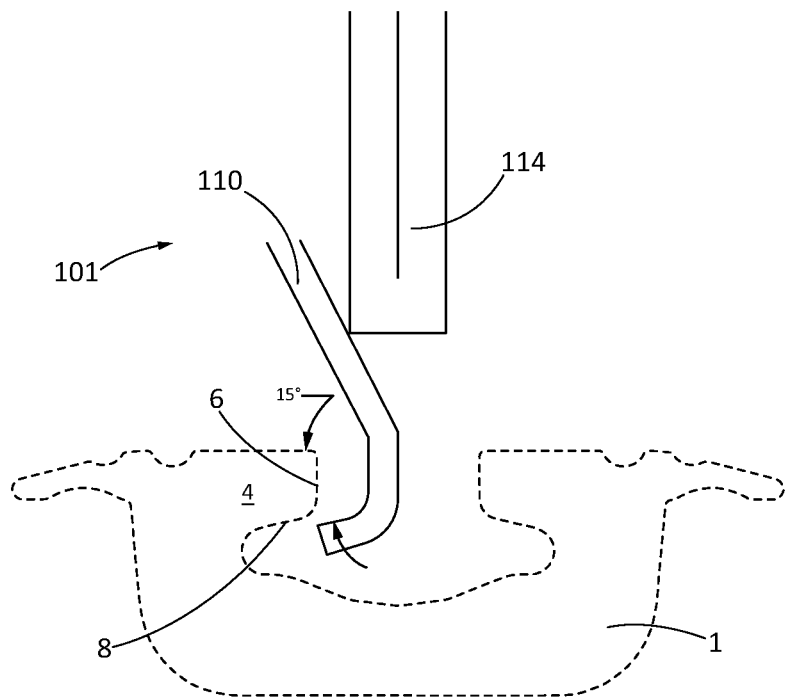
FIG. 12 is a second side view of the improved quick-release track fitting of FIG. 5, which shows the improved quick-release track fitting unlocked and inserted in a track.
Figure 13:
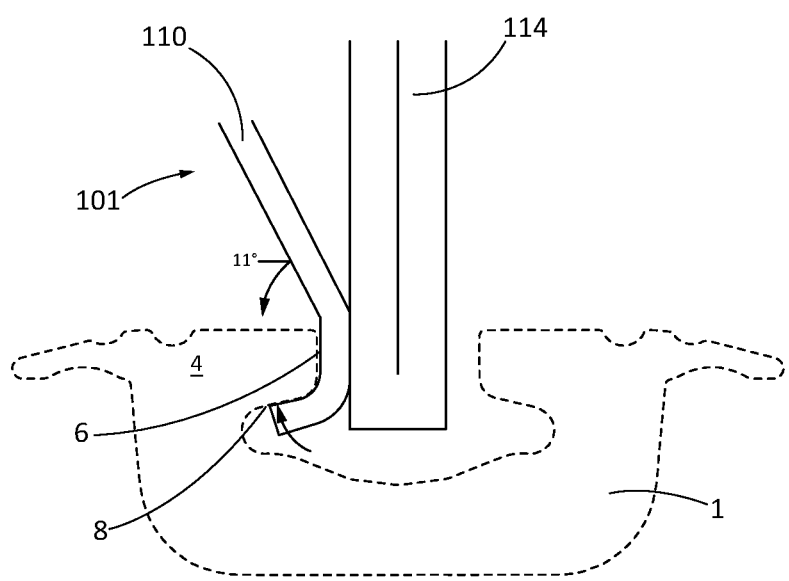
FIG. 13 is a third side view of the improved quick-release track fitting of FIG. 5, which shows the improved quick-release track fitting locked and inserted in a track.
Figure 14:
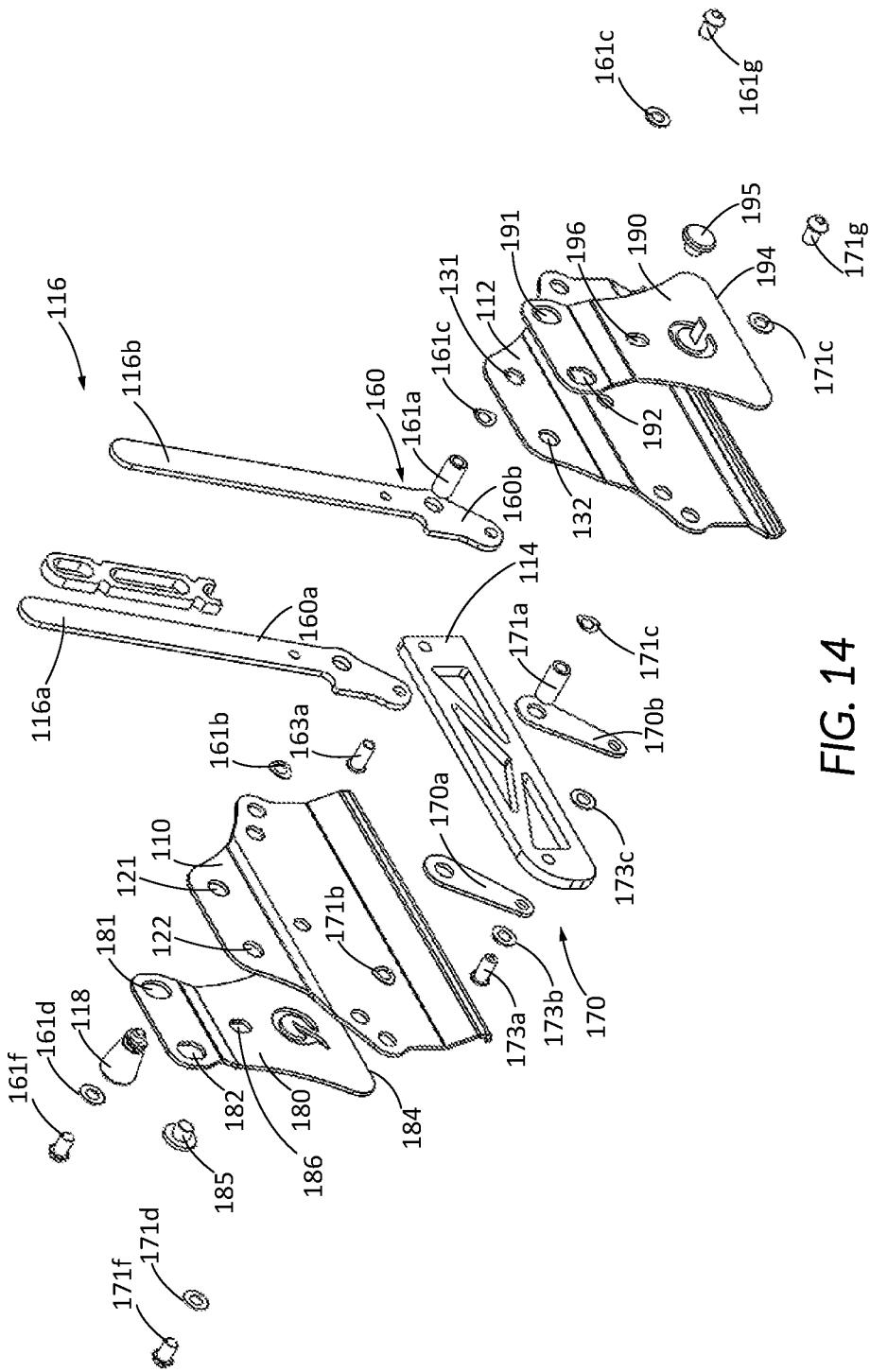
FIG. 14 is an exploded perspective view of the improved quick-release track fitting of FIG. 5.
Figure 15:
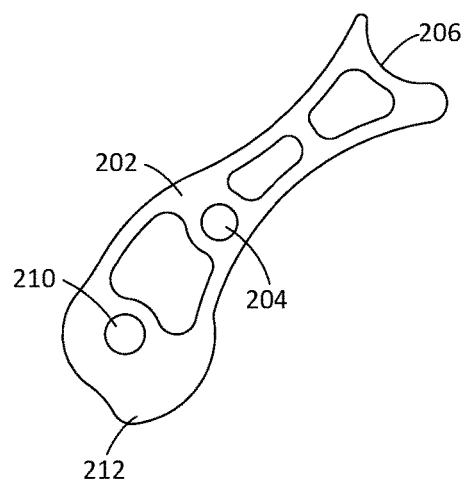
FIG. 15 is side view of a wheel bracket for a fixed wheel assembly.
Figure 16:
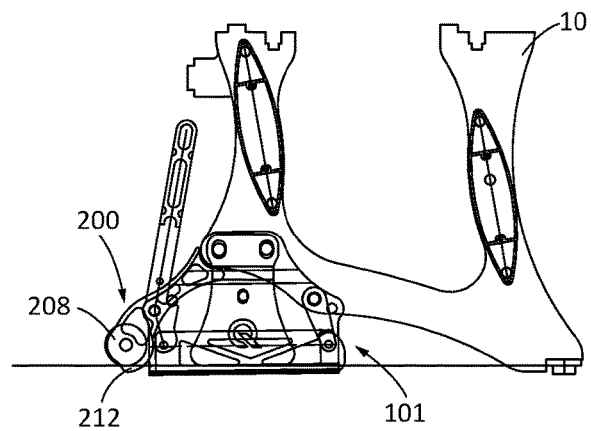
FIG. 16 is a side view of a seat leg assembly comprising the improved quick-release track fitting of FIG. 5 and the fixed wheel assembly of FIG. 15 oriented at a first angle relative to a track.
Figure 17:
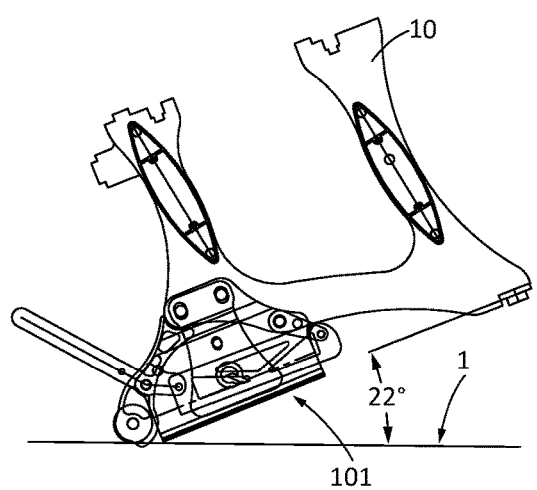
FIG. 17 is a side view of the seat leg assembly of FIG. 16 oriented at a second angle relative to a track.

In one embodiment, the linkage mechanism is configured so that the links 160, 170 are vertical or approximately vertical (within a few degrees as shown in FIG. 7) when the blade 114 is in its lowered position. In that respect, the "moment arm" around pivot points 162, 172 resulting from an upward force on the blade 114 will be small and an upward force on the blade 114 will not translate to a substantial rotational force about pivot points 162, 172 and will not tend to cause the fitting 101 to disengage or unlock from the track 1. In another embodiment, the linkage mechanism may employ an over-center lock, where the final position of pivot points 164, 174 are underneath and to the right of pivot points 162, 172 (as viewed in FIG. 7), and a stop is added to prevent further rotation of links 160, 170 in a counter-clockwise direction (again, as viewed in FIG. 7), where such a stop could engage with any of links 160, 170, or handle 116 and could be a stationary stop unlike the spring-loaded pin 118.

Each of the first plate 110 and the second plate 112 may have an upper region 120, 130 and a lower region 140, 150. The upper regions 120, 130 of the plates 110, 112, as shown, may include upper flanges 124, 134 with apertures 121, 122, 131, 132 that are configured to receive fasteners for connecting to, as one example, seat legs or other structures. In one embodiment, as shown, the upper flanges 124, 134 may be spaced apart to receive a seat leg or other structure therebetween. Alternatively, the quick-release fitting 101 may be formed integrally with any number of structures that one may wish to connect to a track 1 in a vehicle, including but not limited to seats, seat legs, wheelchair tie-downs, occupant restraints, and other structures. In yet another embodiment, the quick release fitting 101 may be provided with one or more fixation elements for connection to such structures. The fixation elements may take any form, such as apertures, fasteners, etc., and may be located anywhere on the quick-release fitting 101.

The upper regions 120, 130 of the plates 110, 112 may be spaced apart (or include spaced apart portions) to define a housing region 113 to prevent fingers or other objects from getting pinched or caught in the linkage mechanism. As shown, the housing region 113 is only partially enclosed by the plates 110, 112 (open at the edges). If desired, additional pinch guards may be positioned to at least partially or fully close the gaps on the sides of the plates 110, 112. The housing region 113 also defines a volume/place for the blade 114 to sit when it is not otherwise positioned to lock the fitting 101 in a track 1, i.e., when the blade 114 is located in a default, first, initial, or unlocked position.

The lower regions 140, 150 may include inwardly inclined segments 146, 156 that slope toward each other, whereby the spacing between the plates 110, 112 decreases from top to bottom. Portions of the lower regions 140, 150 may touch each other at certain locations, as shown, when the blade 114 is located in the raised position. The lower edges of the lower regions 140, 150 each include outwardly directed flanges 142, 152 which, as described in further detail below, are configured for engagement with sloped undersides 8, 9 of the track lips 4, 5. Preferably, when the fitting 101 is engaged with a track 1, the outwardly directed flanges 142, 152 will touch only the sloped undersides 8, 9 of the track lips 4, 5 (or be positioned to touch the sloped undersides 8, 9 of the track lips when an upward force is exerted on the fitting 101), and will not touch or substantially touch the opposing faces 6, 7 of the lips 4, 5 to avoid applying a spreading force or a substantial spreading force on the track 1. The lower regions 140, 150 may further include a neck region (or, e.g., generally vertical segments as shown) 144, 154 located between the inwardly inclined segments 146, 156 and the flanges 142, 152. The neck region 144, 154 may be defined by one or more folds or bends in the plates 110, 112 and may be approximately equal in length to or longer than the height of the opposing faces 6, 7 of the lips 3, 4 to eliminate or reduce contact between the lower regions 140, 150 of the fitting 101 and the opposing faces 6, 7 of the track 1, and to thereby eliminate or reduce the spreading forces exerted on the track 1 as compared to the prior-art NMI fitting.

As can be appreciated from the figures, at least a portion of one or more of the upper regions 120, 130 and the lower regions 140, 150 of the plates 110, 112 may be provided with resilient properties and may be resiliently biased toward each other (being constructed for example of a metal material, or including spring hinges), and may as shown touch each other. In that regard, when the blade 114 is in the raised (unlocked) position, the thickness t between the outer edges of the flanges 142, 152 is less than the gap between the opposing faces 6, 7 (i.e., the open channel 2) in the track 1, and as such the fitting 101 can be both inserted into and removed from the track 1. As the blade 114 is moved to its lowered (locked) position, the blade 114 engages with the inwardly inclined segments 146, 156, whereby the blade 114 induces a spreading force on the plates 110, 112 that counters their resilient nature. In its final lowered position, the blade 114 may be positioned between the generally vertical segments 144, 154 (if present). In that regard, the thickness t between the outer edges of the flanges 142, 152 will be greater than before, when the blade is in the raised position, and more particularly greater than the gap between the opposing faces 6, 7 (i.e., the open channel 2) in the track 1, and as such the fitting 101 (if inserted into the track 1 before lowering the blade 114) will be lockingly engaged in the track 1 and cannot be removed.

To ensure smooth engagement between the blade 114 and the inwardly inclined segments 146, 156, and to reduce or minimize the force that must be exerted on the handle 116 to lower the blade 114, the linkage mechanism may be configured so that the blade 114 engages with the inwardly inclined segments at an angle relative to horizontal. In that regard, the force of the blade 114 pushing the inwardly inclined segments apart may at first be concentrated at one of either the front corner 115 or the rear corner 117 of the blade 114, before the force spreads along the entire width of the blade 114. Ideally, the linkage mechanism may also be configured so that the blade 114 is positioned generally horizontal when it is in its fully lowered position, to ensure that the spreading force exerted by the blade 114 on the lower regions 140, 150 will be generally consistent along the entire width of the fitting 101. The linkage mechanism shown in the figures achieves this "rotation" of the blade 114 as it is moved from its raised position, to its lowered position through use of the following geometry: pivot points 164, 174 are positioned on the blade 114 at approximately equal height relative to the lower edge of the blade 114 (i.e., a line drawn through pivot points 164, 174 are generally parallel to the lower edge); pivot point 172 is located at a higher elevation than pivot point 162, relative to the lower edge of plates 110, 112; and link 170 (i.e., the distance between pivot point 172 and pivot point 174) is longer than link 160 (i.e., the distance between pivot point 162 and pivot point 164) by an amount approximately equal to the difference between the elevations of pivot point 162 and pivot point 172. With the shown geometry, the front corner 115 will be lower than the rear corner 117 when the blade 114 is in the raised position and when the blade is being moved from the raised position to the lowered position, but the front corner 115 will be at approximately the same elevation as the rear corner 117 when the blade is in the lowered position.

In contrast to the prior art NMI device, the flanges 142, 152 may be oriented an angle relative to horizontal that generally corresponds to the angle of the undersides 8, 9 of the lips 4, 5, whereby the flanges 142, 152 will sit closely adjacent to the undersides 8,9 of the lips 4, 5 when the fitting 101 is secured in the track 1. Preferably, gaps between the flanges 142, 152 and the undersides 8, 9 will be either non-existent or relatively small (whereby the gaps will close when the fitting 101 experiences an upward force), the flanges 142, 152 will be parallel or closely parallel to the undersides 8, 9, and contact between the flanges 142, 152 (or other portions of the fitting 101) and the opposing faces 6, 7 will be non-existent, insignificant, or small. In one embodiment, the angle of the flanges 142, 152 may be approximately equal to, within a few degrees of, within 5° of, within 10° of, or within 15° of the angle of the undersides 8, 9. Alternatively, the angle of the flanges 142, 152 may be set at a "universal" angle relative to horizontal so that the angle corresponds to many or most commercially available tracks. In one embodiment, the angle of the flanges 142, 152 relative to horizontal may be set at approximately 15° (when the blade 114 is in the raised position), which depending upon the resiliency of the material used for the fitting 101 and the shape and resiliency of the track 1 may change to be approximately 11° when the blade 114 is in the lowered position. Alternatively, the angle of the flanges 142, 152 may be set to within a few degrees of, within 5° of, within 10° of, or within 15° of 15° (again, when the blade 114 is in the raised position).

Track leveling members 180, 190 may be provided to assist in vertically positioning the fitting 101 relative to the track (e.g., to ensure that the neck regions 144, 154 are positioned between (i.e., at the same elevation as) the opposing faces 6, 7 of the track lips 4, 5. The track leveling members 180, 190 include features for attachment to the fitting 101, such as apertures 181, 182, 191, 192 that align with apertures 121, 122, 131, 132, apertures 181, 182, 191, 192 preferably being oval in shape to permit adjustment upward and downward. In that regard, track leveling members 180, 190 may be secured to the seat leg (or other structure) contemporaneously with the fitting 101 using common fasteners. The track leveling members 180, 190 further include horizontal lower surfaces 184, 194 configured to engage with the upper surface of track 1 on either side of the open channel 2. To provide a vertical guide for adjusting the track leveling members 180, 190 up and down, rivets 185, 195 may be secured to each of plates 110, 112 and extend through vertically-oriented elongated slots/apertures 186, 196 in the track leveling members 180, 190.

Turning now to FIGS. 15-18, the fitting 101 may be provided with a fixed roller wheel assembly 200 that permits the structure being supported by the fitting 101 (in this case, a seat leg 10 for a seat) to be tilted rearward and moved to another location, either at a different location along the length of the track 1 or out of the vehicle entirely. The roller wheel assembly 200 may include a bracket 202 which connects to one or both the fitting 101 or the seat leg 10 and may engage in some manner with one or both the fitting 101 and seat leg 10. As shown, the bracket 202 has a thin profile and includes an aperture 204, whereby the bracket 202 can be disposed between links 160*a*, 160*b* with aperture 204 aligned with pivot point 162 and receiving pin assembly 161 for securement to the fitting 101. In this location, the bracket does not interfere with the movement of the linkage mechanism or with the blade 114 in both its raised and lowered position. The upper end of the bracket 202 may include a support surface 206 that engages with a corresponding surface of the seat leg 10 to prevent the bracket 202 from pivoting about aperture 204. Moreover, the engagement between support surface 206 and seat leg 10 may also serve to divert at least a portion of the weight of the seat around the fitting 101 when the seat is tilted rearward, whereby the seat weight is at least partially, primarily, or entirely directed through the bracket 202 to one or more wheels 208 located at a lower end of the bracket 202. The bracket 202 may include a second aperture 210 for attachment to the wheel 208. The bracket 202 may further include a location member 212 at the lower end of the bracket 202, whose purpose will be described below. To reduce its weight, the bracket 202 may include various cutouts.

Figure 18:
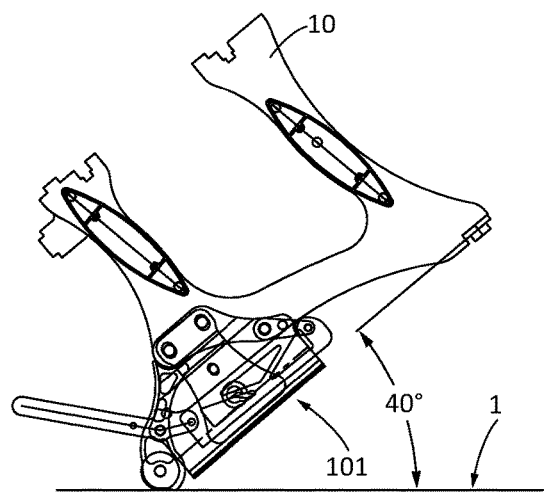
FIG. 18 is a side view of the seat leg assembly of FIG. 16 oriented at a third angle relative to a track.
Figure 19:
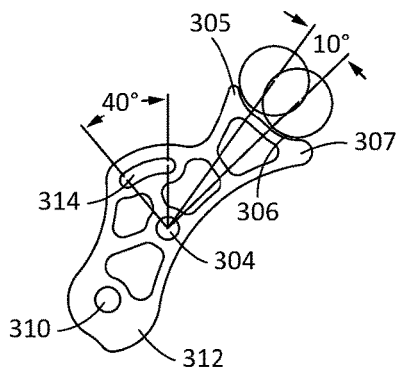
FIG. 19 is side view of a wheel bracket for a rocking wheel assembly.
Figure 20:
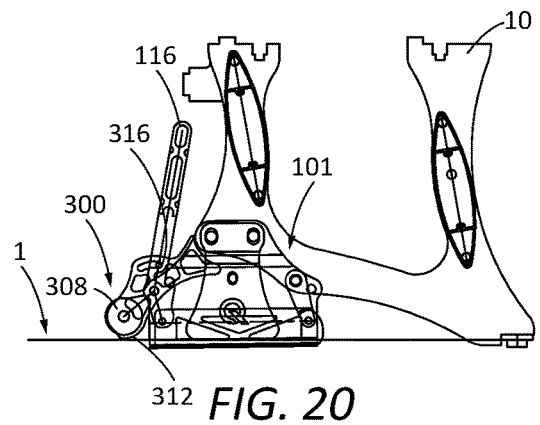
FIG. 20 is a side view of a seat leg assembly comprising the improved quick-release track fitting of FIG. 5 and the rocking wheel assembly of FIG. 19 oriented at a first angle relative to a track, with the lever of the track fitting in a locked position.
Figure 21:
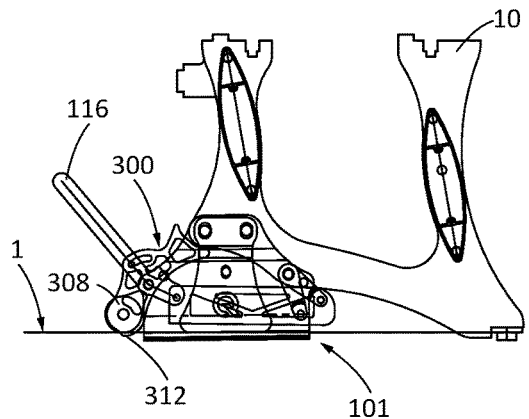
FIG. 21 is a side view of the seat leg assembly of FIG. 20 oriented at the first angle relative to the track, with the lever of the track fitting in an unlocked position.
Figure 22:
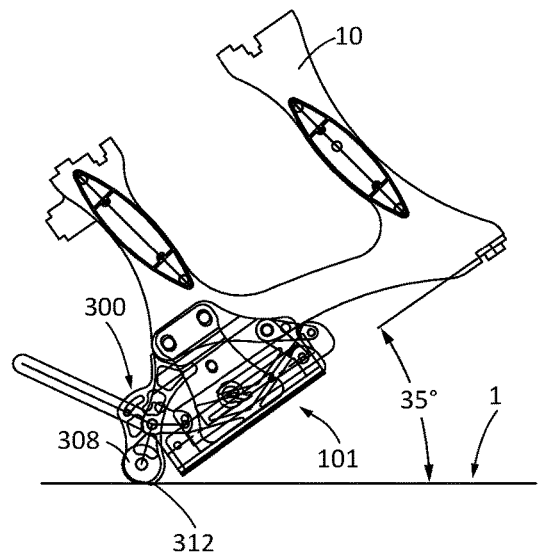
FIG. 22 is a side view of the seat leg assembly of FIG. 20 oriented at a second angle relative to the track, with the lever of the track fitting in an unlocked position.
Figure 23:
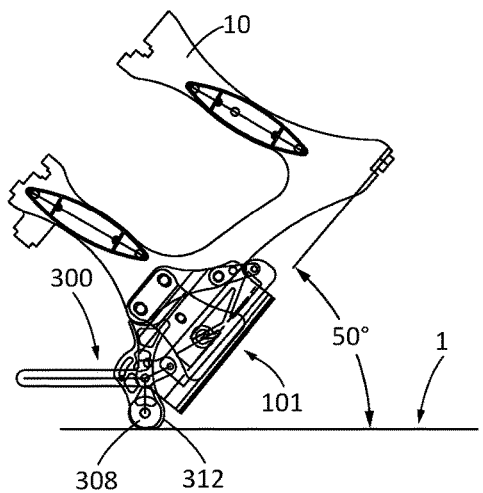
FIG. 23 is a side view of the seat leg assembly of FIG. 20 oriented at a third angle relative to the track, with the lever of the track fitting in an unlocked position (prior to toppling of the wheel bracket); and, FIG. 24 is a side view of the seat leg assembly of FIG. 20 oriented at the third angle relative to the track, with the lever of the track fitting in an unlocked position (after toppling of the wheel bracket).
Figure 24:
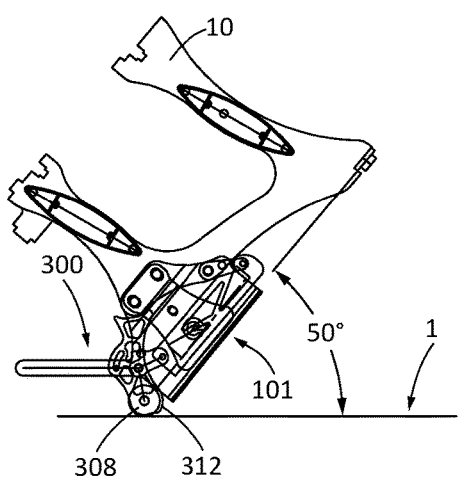

Notably, when the fitting 101 is secured in the track 1 (see FIG. 16), the location member 212 will be located in the open channel 2 of the track 1, between the lips 4, 5 and below the upper surface of the track 1, while the wheel 208 will be elevated slightly above the upper surface of the track 1. The location member 212 will serve to help keep the fitting 101 aligned with the open channel 2, even when the fitting 101 is unlocked from the track 1 and when the seat is tilted backward for at least a first range of angles (for example, between 0-40°) and moved along the length of the track 1 to another location (see FIG. 17). However, as shown in FIG. 18, the location member 212 may be configured so that it will be elevated above the upper surface of the track 1 at the second range of angles (for example >40°) so that the seat and fitting 101 can be moved out of alignment with the track 1 (for example, to move the seat to the different row of tracks of to remove the seat from the vehicle).

Turning now to FIGS. 19-24, the fitting 101 may alternatively be provided with a rocking roller wheel assembly 300 that also permits the structure being supported by the fitting 101 (in this case, a seat leg 10 for a seat) to be tilted rearward and moved to another location, either at a different location along the length of the track 1 or out of the vehicle entirely. The roller wheel assembly 300 may include a bracket 302 which connects to one or both the fitting 101 or the seat leg 10 and may engage in some manner with one or both the fitting 101 and seat leg 10. As shown, the bracket 302 has a thin profile and includes an aperture 304, whereby the bracket 302 can be disposed between links 160*a*, 160*b* with aperture 304 aligned with pivot point 162 and receiving pin assembly 161 for securement to the fitting 101. In this location, the bracket does not interfere with the movement of the linkage mechanism or with the blade 114 in both its raised and lowered position. The upper end of the bracket 302 may include a support surface 306 that engages with a corresponding surface of the seat leg 10 to limit the range of angles to which the bracket 302 may pivot about aperture 304 (in this case a range of approximately 10°). Moreover, the engagement between support surface 306 and seat leg 10 may also serve to divert at least a portion of the weight of the seat around the fitting 101 when the seat is tilted rearward, whereby the seat weight is at least partially, primarily, or entirely directed through the bracket 302 to one or more wheels 308 located at a lower end of the bracket 302. The bracket 302 may include a second aperture 310 for attachment to the wheel 308. The bracket 302 may further include a location member 312 at the lower end of the bracket 202, whose purpose will be described below. The bracket 302 may further include a curved slot 314 in which a pin 316 may translate or slide from end to end. The pin 316 in this case is fixed through an aperture in the lever 116. To reduce its weight, the bracket 302 may include various cutouts.

Notably, when the fitting 101 is secured in the track 1 (see FIG. 20), the lever 116 will be in its uppermost position, whereby pin 316 will engage with a first end of the slot 314 to hold the wheel 308 and location member 312 above the upper surface of the track 1 (with shoulder 305 of the support surface 306 resting against the seat leg 10). In this case, the slot 314 is a generally circular segment with its center located at aperture 304 and with an arc length of 40°, while the lever 116 has a travel of approximately 50° between its uppermost (locked) position and its lowermost (unlocked position). In that respect, the roller assembly 300 is configured so that the lever 116 lifts the wheel 308 by approximately 10° (about aperture 304) when the lever 116 is in its uppermost position (compare FIGS. 20 and 21). Obviously, these angles may change for different seat and fitting 101 configurations, geometries, and dimensions.

When the lever 116 is in its lowermost position (see FIG. 21), the location member 312 will be located in the open channel 2 of the track 1, between the lips 4, 5 and below the upper surface of the track 1, while the wheel 308 will rest on the upper surface of the track 1 and shoulder 307 of the support surface 306 will rest against the seat leg. When the seat is tilted backward (see FIG. 22) the bracket 302 will rotate 10° relative to the seat leg 10, before the weight of the chair is transferred to the wheel 308, i.e., when the shoulder 305 will again butt up to the seat leg 10, to help create tilt of the seat. In that respect, this configuration allows the seat to tilt 10° before the wheel 308 substantially engages on the floor. Thus, the seat's center of gravity is moved rearward before the seat is free to move on the wheel 308, and the seat is less likely to roll (without tilting) than in the fixed design described above. When the seat is oriented at at least a first range of angles (in this case approximately 10-45°), the seat can be rolled in the track, whereby the location member 312 will be below the upper surface of the track 1 keeping the fitting 101 in alignment with the open channel. Once the angle exceeds a threshold angle (in this case approximately 45°), the location member 312 will be above the upper surface of the track whereby the seat can be rolled on flat ground. When the seat is tilted rearward past a second threshold angle (in this case approximately 50°—see FIG. 23), the bracket 302 will topple (rotate approximately 10° in this case) relative to the seat leg 10 (see FIG. 24), whereby shoulder 307 will again contact the seat leg 10. Given the change in angle between the bracket 302 and the seat leg 10 (compare FIGS. 23 and 24), the seat can be rolled on flat ground for a larger range of angles after toppling (in this case, when the angle exceeds approximately 35°, rather than approximately 45° before toppling).

For multiple reasons, including but not limited to cost, at least some of the components, including but not limited to plates 110, 112, blade 114, lever 116, links 160, 170, track leveling members 180, 190, and brackets 202, 302, may preferably be formed (e.g., stamped, cut, bent, drilled, or similar processes) from a sheet metal material. For similar reasons, at least some of the components, including but not limited to plates 110, 112, links 170a, 170b, links 160a, 160b, levers 116a, 116b, and track leveling members 180, 190, may be non-handed, or reversible, in that they can be used interchangeably.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A quick-release track fitting for engaging with a track having two inwardly directed lips, the quick-release track fitting comprising:
   a first plate positioned adjacent a second plate, the first plate having a first lower region and the second plate having a second lower region;
   a blade being moveable between a first position in which the blade is substantially disengaged from at least one of the first lower region and the second lower region and a second position in which the blade engages with at least one of the first lower region and the second lower region to move at least one of the first lower region and the second lower region away from the other of the first lower region and the second lower region;
   at least one link having a first pivot point connecting a first end of the at least one link to at least one of the first plate and the second plate and a second pivot point connecting a second end of the at least one link to the blade, the at least one link being operable to control the movement the blade between the first position and the second position, wherein substantially the entire blade is disposed below the first pivot point of the at least one link in both the first position and the second position.

2. The quick-release track fitting of claim 1, wherein the at least one link comprises at least two links.

3. The quick-release track fitting of claim 1, wherein the at least one link consists of two links, whereby the blade, at least one of the first plate and the second plate, and the two links define a four-bar linkage.

4. The quick-release track fitting of claim 1, wherein the blade has a blade longitudinal axis and the at least one link has a link longitudinal axis, whereby the link longitudinal axis is approximately normal to the blade longitudinal axis when the blade is in the second position.

5. The quick-release track fitting of claim 1, wherein a lever is rigidly connected to and extends from the at least one link, the lever allowing for manipulating the blade between the first position and the second position by a hand.

6. The quick-release track fitting of claim 3, wherein the four-bar linkage is configured such that one side of a lower edge of the blade is lower than an opposite of the lower edge when the blade is disposed between the first position and the second position.

7. The quick-release track fitting of claim 6, wherein the four-bar linkage is configured such that the one side is at approximately the same elevation as the opposite side when the blade is disposed in the second position.

8. The quick-release track fitting of claim 7, wherein the first position is an unlocked position and the second position is a locked position.

9. The quick-release track fitting of claim 1, wherein a first flange depends from the first lower region and a second flange depends from the second lower region, both at a flange angle that generally corresponds to a lip angle of an underside of the inwardly directed lips of the track.

10. The quick-release track fitting of claim 9, wherein the flange angle is approximately equal to the lip angle.

11. The quick-release track fitting of claim 9, wherein the flange angle is within 5° of the lip angle.

12. The quick-release track fitting of claim 9, wherein the flange angle is within 10° of the lip angle.

13. The quick-release track fitting of claim 9, wherein the flange angle is within 15° of the lip angle.

14. The quick-release track fitting of claim 1, wherein a first flange depends from the first lower region and a second flange depends from the second lower region, both at a flange angle of approximately 15° relative to horizontal.

15. The quick-release track fitting of claim 1, wherein a first flange depends from the first lower region and a second flange depends from the second lower region, both at a flange angle of approximately 10-20° relative to horizontal.

16. The quick-release track fitting of claim 1, wherein a first flange depends from the first lower region and a second flange depends from the second lower region, both at a flange angle of approximately 5-25° relative to horizontal.

17. The quick-release track fitting of claim 1, wherein a first flange depends from the first lower region and a second flange depends from the second lower region, both at a flange angle of approximately 0-30° relative to horizontal.

18. The quick-release track fitting of claim 1, further comprising a spring-loaded locking pin for holding the blade in the second position, the spring-loaded locking pin being fixed to one of either the first plate or the second plate and being aligned for engagement with a detent when the blade is in the second position, the detent being fixed to one of the blade or the at least one link.

19. The quick-release track fitting of claim 18, wherein the detent extends from the at least one link.

20. The quick-release track fitting of claim 1, wherein the first lower region and the second lower region each include a flange depending from a neck region, wherein each flange is configured to engage with an underside of the two inwardly directed lips when the quick-release track fitting is secured in the track, and each neck region includes a neck height that is greater than a face height of an opposing face of the two inwardly directed lips.

21. The quick-release track fitting of claim 20, wherein each neck region is configured for substantial non-contact with the opposing face of the two inwardly directed lips.

22. The quick-release track fitting of claim 20, wherein each neck region is substantially vertical.

23. The quick-release track fitting of claim 20, wherein each neck region is configured to substantially eliminate a spreading force from being exerted on the opposing face of the two inwardly directed lips.

\* \* \* \* \*